Nov. 16, 1965     G. W. BROWN ETAL     3,217,852
FLUID PRESSURE OPERATED CLUTCH

Filed April 26, 1963     2 Sheets-Sheet 2

INVENTORS
GAYLORD W. BROWN
DONALD J. RISE
BY
*Learman and McCulloch*
ATTORNEYS

United States Patent Office 3,217,852
Patented Nov. 16, 1965

3,217,852
FLUID PRESSURE OPERATED CLUTCH
Gaylord W. Brown and Donald J. Rise, Beaverton, Mich., assignors to Brown Machine Company of Michigan, Inc., a corporation of Michigan
Filed Apr. 26, 1963, Ser. No. 276,000
6 Claims. (Cl. 192—142)

This invention relates to clutch systems and more particularly to a clutch system of novel design which is energized by fluid under pressure.

One of the prime objects of the invention is to provide a clutch which is particularly suited to driving chains for advancing a sheet of plastic or other material in a machine such as a plastic forming machine. While the clutch is eminently suitable for connecting and disconnecting such chains with a reciprocating power device to provide a material advancing stroke in such a machine, it is not our intention to in any way indicate that the use of the clutch is limited to such machines. Rather, it is believed it will become evident that the mechanism is capable of performing diverse functions in many different types of machines.

Another of the prime objects of the invention is to provide a clutch system which theoretically could transmit a stroke of infinitely variable but positively controlled length and which is so designed that there is no wear of the clutch unit on the power stroke.

Another object of the invention is to provide an extremely rapidly operating clutch which is almost instantaneously actuated and released and is capable of engaging and releasing within a very short time cycle of operation.

A further object of the invention is to provide a simple and reliable clutch system which, because no thrust bearings are required, operates for long periods of time without the need for maintenance or repair, and which can be relatively simply and economically manufactured.

Other objects and advantages of the invention will be pointed out specifically or will become apparent from the following description when it is considered in conjunction with the appended claims and the accompanying drawings, in which:

FIGURE 1 is an end elevational view illustrating a typical clutch installation on a plastics forming machine or the like;

FIGURE 4 illustrates a typical pneumatic-electric circuit for the system.

Figure 1:
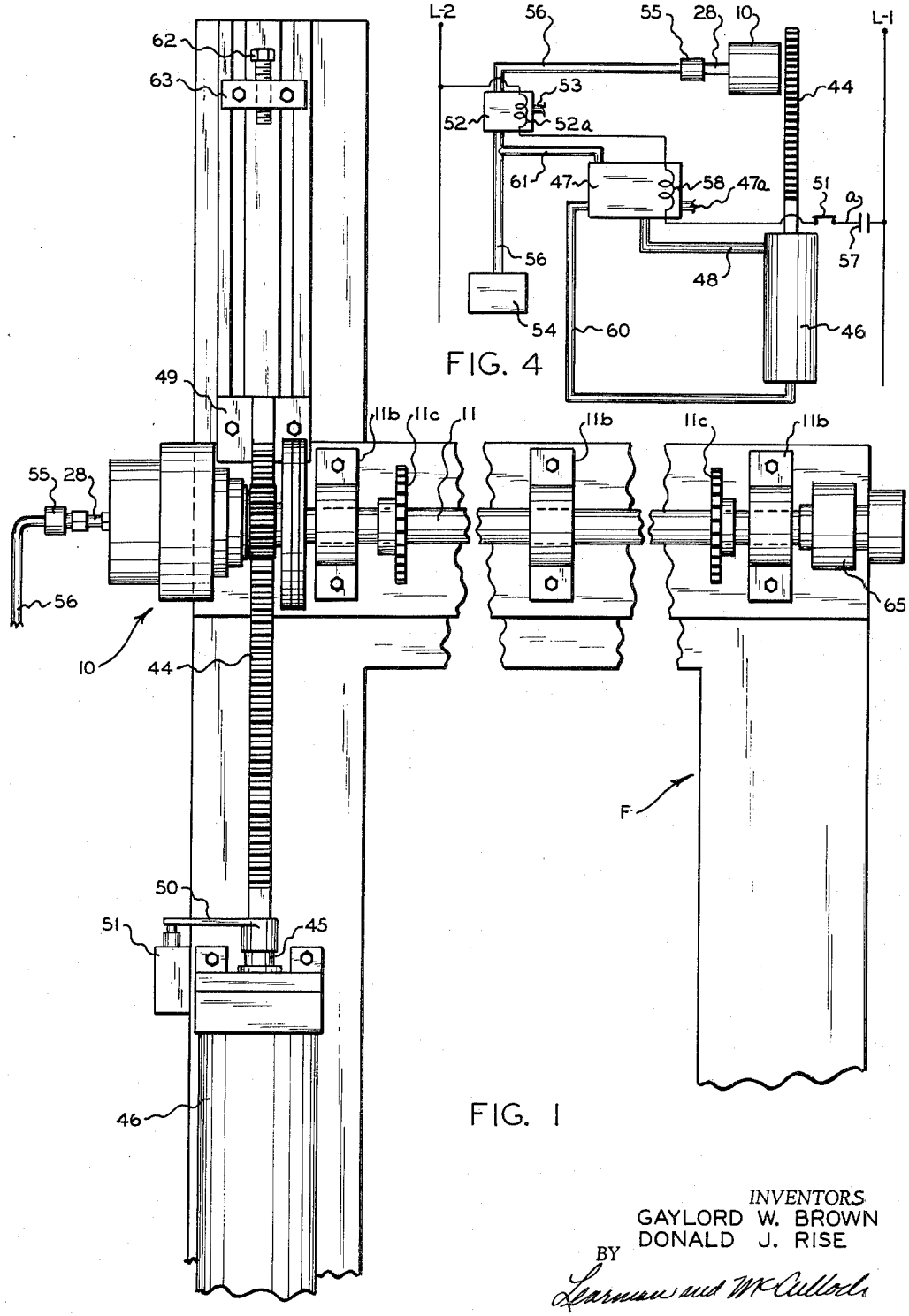

Referring now more particularly to the accompanying drawings, in which a preferred embodiment of the invention only has been illustrated, a numeral 10 generally indicates the clutch assembly, which is shown mounted on the shaft 11 which is to be driven. It will be readily understood that sprockets 11c or the like are mounted on the shaft 11, which is supported by bearings 11b on the frame. F of the machine, to drive the chains advancing the sheet through the forming machine in the usual manner. A typical forming machine is illustrated in the book entitled "Fundamentals of Sheet Forming," published in 1960 by The Dow Chemical Company, wherein a forming machine of the character mentioned is depicted as the Brown continuous forming machine, manufactured by Brown Machine Company, of Beaverton, Michigan.

The clutch 10, which is mounted for rotation with the shaft 11, includes a generally cylindrical, shouldered housing 12 with an integral end wall 13. At its opposite end the clutch housing 12 is closed by a cup-like end closure member 14 which is securely fixed in position as shown. Provided intermediate the end walls 13 and 14 is a diaphragm assembly generally designated 15 which includes an annular pressure plate member 16 which is threaded as at 16a to receive the threaded post 17 of a diaphragm core member 18. Mounted on the member 16 and receiving the member 18 is an inner clamp plate 19 which is provided with an annularly bent-in socket portion 19a. An outer clamp plate 20 has an axially turned terminal edge 20a and it will be seen that the radially inner beaded edge 21a of a flexible, annular diaphragm member 21 is clamped between the lip or edge 20a and socket portion 19a. The diaphragm 21 is preferably formed of a strong, nonstretchable, reinforced fabric and its reversely turned, radially outer edge includes a bead portion 21b which is received between the terminal edge 22a of the clamp plate 22 and the shouldered portion 12a of the cylindrical wall of the housing 12, as shown. A nut member 17a is employed to secure the assembly in position on the plate 16 and threaded members 23 are provided to secure the plates 18–20 in assembled relation, nuts 24 being tightened down on the members 23, as shown, so that the bead 21a will be firmly held by the assembly. Similarly, threaded members 25 with nuts 26 are provided to secure the clamp plate 22 to the one end wall 13 of the housing 12.

Mounted in the one end wall 13 is a fitting 27 for receiving a threaded air supply tube 28 and it will be seen that an opening 29 is provided in the clamp plate 22 so that air under pressure is readily admitted to the sealed chamber 30 formed by the diaphragm assembly 15, and the housing walls 12 and 13.

The opposite end wall 14 of the housing 12 is threaded as at 31, and a guide block 32 which is secured on the wall 14 is similarly threaded as at 33, to receive the threaded end 11a of the shaft 11 which is to be driven. Extending through guide openings 34 and 35 in the housing end wall 14 and guide member 32, respectively, are force transmitting floating thrust plungers or pins 36 which engage a thrust washer 37 mounted on a shouldered ring 38 carried by the shaft 11. Fixed on the shaft 11 is the clutch disk 39, which is recessed as at 39a to receive a floating raybestos fiber ring 40, and opposite the disk 39 is a normally disengaged, driving clutch disk 41 having a hub portion 41a, as shown. The hub portion 41a of the driving clutch disk 41 is normally freely revolvable on the shaft 11 and interposed between the hub 41a and shaft 11 is a bearing or bushing 42. It will be seen that the clutch hub 41a mounts a gear 43 in meshed engagement with a gear rack 44 which is to furnish the drive for the shaft 11 in the present instance.

As shown particularly in FIGURE 1, the rack 44 may be secured to the piston rod 45 of a double-acting air cylinder 46 which may be controlled by the Hannifin valve, Model HH–200–50, which we have designated 47. When the valve 47, which vents to atmosphere as at 47a, admits air to the cylinder 46 through line 48 and the rack 44 is moved downwardly in its guide 49, an arm 50 thereon finally moves into engagement with a normally closed limit switch 51 on the frame F of the machine. At the time that rack 44 is started downwardly, normally closed Hannifin spool valve 52 which vents to atmosphere as at 53 opens to admit air under a pressure of about 80 p.s.i. to the line 28 and clutch 10 from the compressor or other source 54. Since the clutch 10 spins with the shaft 11 when the rack 44 is moved downwardly and the clutch is engaged, a rotary joint 55 is provided connecting the line 28 with the line 56 extending from the air source 54.

Figure 2:
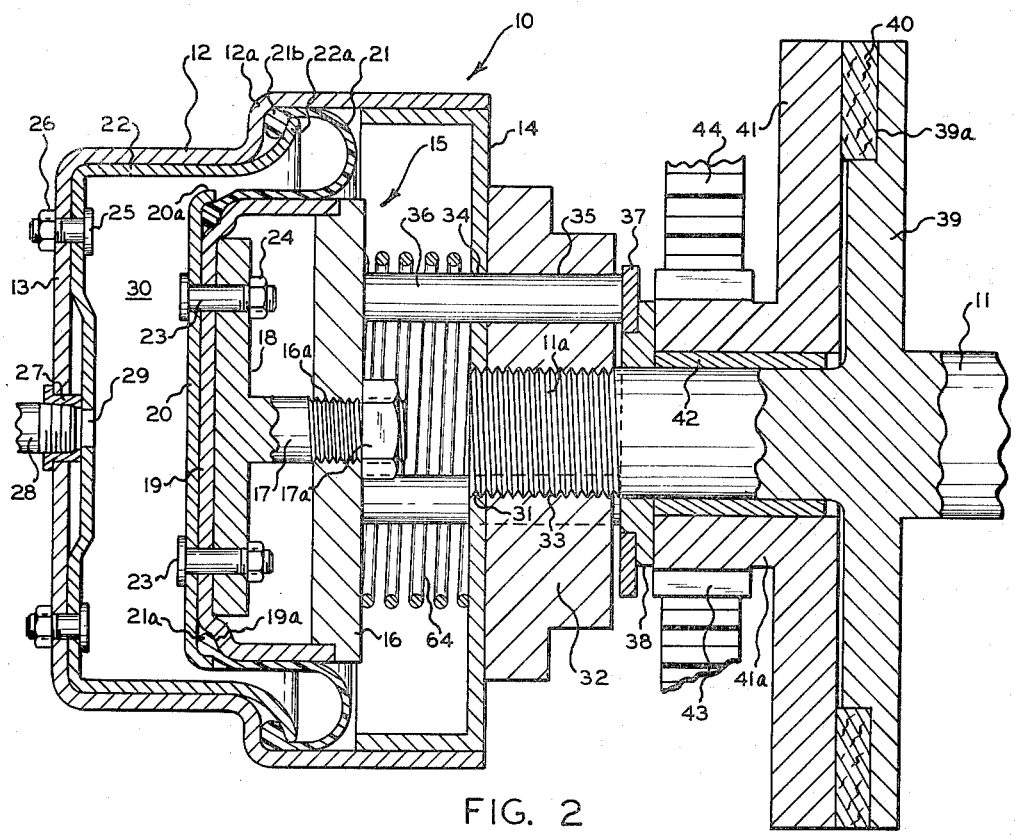
FIGURE 2 is a greatly enlarged, sectional, elevational view of the clutch, the clutch being depicted in engaged position.
Figure 3:
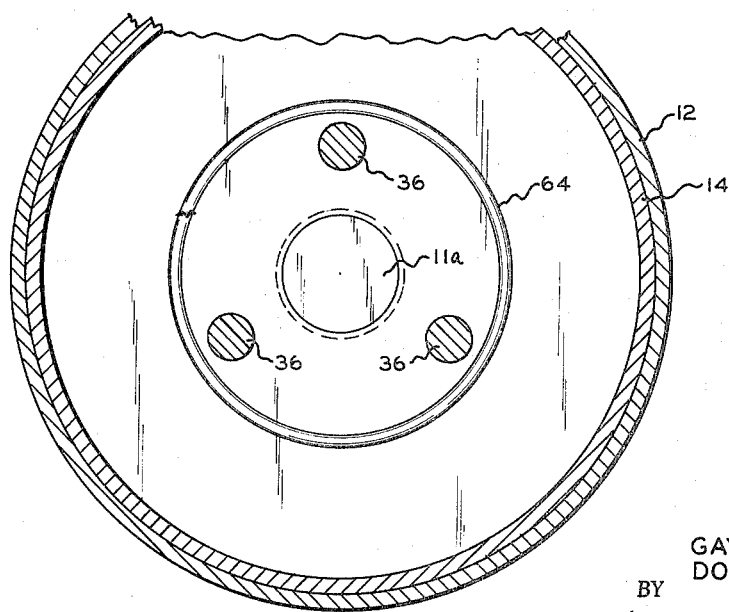
FIGURE 3 is a transverse sctional view through the clutch.

In FIGURE 4 we have shown a typical pneumatic-electric system, but it is to be understood that other such systems may be employed. An Eagle multiflex timer has contacts 57 in the circuit line $a$ which spans the power lines $L_1$ and $L_2$, and the valve 47 solenoid 58 and valve 52 solenoid 52a are in circuit line $a$. Air is supplied to the cylinder 46 for the return stroke through the line 60, as shown, and a branch line 61 leading from line 56 supplies air to the control valve 47. When the rack 44 nears the end of its upward stroke it engages and is positively halted by the adjustable stop 62 which is supported by the bar 63. In the operation of the system, the timer initially closes the timer contacts 57 and energizes solenoid 58 to supply fluid through line 48 while exhausting it through line 60 out vent 47a. This moves the rack member 44 downwardly and at the same time, the solenoid 52a of valve 52 is energized and air is admitted from the line 56 through line 28 to the chamber 30 to immediately force clutch disk 41 into engagement with clutch disk 39. The admission of air pressure to chamber 30 moves the diaphragm assembly 15 to the right in FIGURE 2 and causes plate 16 to engage pins 36 and pins 36 to engage and exert a pressure against the thrust washer 37 which moves the clutch disk 41 toward the clutch disk 39 to compress the fiber ring 40 and cause driving engagement between the clutch disks 41 and 39. Since the action of clutch 10 is, for practical purposes, instantaneous, the movement of gear rack 44 is immediately transferred to the spur gear 43 on clutch disk 41 and the shaft 11 is immediately driven to advance the sheets of plastic or perform whatever operation is to be performed. At this time the clutch 10 revolves with the shaft 11, so that there is no rotation of the clutch disk 41 relative to the shaft 11 and no wear of bearing 42 occurs during the power stroke. When the actuator bar 50 reaches and depresses the normally closed limit switch 51 the solenoid 58 is deenergized and valve 47 immediately channels air through line 60 and bleeds it through line 48 and vent 47a to force rack 44 upwardly until it is stopped by the stop bolt 62. During the return stroke of gear rack 44, solenoid 52a is, of course, deenergized and the clutch disks 41 and 39 are disengaged so that the clutch member 41 spins freely on the bearing 42. The air from clutch chamber 30 is bled out the vent 53 when the solenoid 52a is deenergized. A one-way brake 65 of the type manufactured by Morse Chain Co., Model PB8, is provided to insure that the shaft 11 does not rotate reversely at this time and remains positively fixed in "advanced" position.

The whole down and up movement requires only about 2½ seconds. In some instances it may be desirable to employ a return spring 64 but in smaller installations no such spring has been found to be necessary. During a predetermined period during which time the forming operation is being performed, the rack 44 remains in "up" position against the stop screw 62 until the timer closes contacts 57 to energize solenoids 58 and 52a and start the cycle once again.

It should be apparent that we have perfected a clutch assembly of great practicality which is not only ideally suited to the purpose which we have described but will find a multitude of other uses. It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. In a clutch system: a housing; a diaphragm therein separating said housing into chambers; a first shaft means connected with one end of said housing and extending outwardly therefrom; means to be driven connected with said first shaft means; a second shaft means; bearing surface means journaling said second shaft means on said first shaft means, and mounting said shaft means for relative axial movements; confronting clutch members connected with said first and second shaft means axially outward of said housing; motion transmission means adjacent said diaphragm, extending through one of said chambers and said housing to actuate said clutch members into engagement when the diaphragm is moved in one direction; pinion means on said second shaft means; rack gear means in mesh with said pinion means; fluid pressure operated means connected with and moving said rack means in one direction to drive said pinion means; means for introducing air under pressure into the other chamber of said housing simultaneously with movement of said rack gear means to actuate said diaphragm and motion transmission means and move the clutch member on one shaft means axially into driving engagement with the clutch member on the other shaft means when the rack means is moved in one direction; and means actuated automatically when the rack reaches substantially the end of its travel in one direction operatively connected to bleed air from said other chamber to permit said pinion means to spin freely when the rack means is moved in the other direction.

2. A system as set forth in claim 1 wherein the motion transmission means comprises circumferentially spaced axial pins.

3. A system as set forth in claim 1 wherein said bearing surface means is movable axially.

4. A system as set forth in claim 1 in which said means actuated automatically to bleed air comprises switch means in the path of said rack.

5. The combination defined in claim 2 in which said diaphragm includes a rigid metallic hub means and an outer flexible ring having bead means on its inner and outer peripheral edges and having its outer edge turned reversely; clamp plate means with socket means receiving the bead means on the inner peripheral edge of the flexible ring secured to said hub means; and clamp plate means fixed to the opposite end of the housing having socket means receiving the bead means on the reversely turned outer peripheral edge of the flexible ring.

6. In a clutch system; a closed, generally cylindrical housing; a fabric diaphragm therein, including a central metallic hub, separating said housing into chambers; a first shaft connected with one end of said housing extending outwardly therefrom; a second shaft, surrounding and journaled on said first shaft, and movable axially thereon; bearing means between said first shaft and second shaft; a spur gear on said second shaft; a reciprocable rack gear in mesh with said spur gear; radially extending, confronting clutch discs on said first shaft and second shaft means with the disc on the second shaft means inwardly of the disc on the first shaft; a thrust ring on said second shaft inward of said spur gear; circumferentially spaced, axially extending, floating pins adjacent said piston-like hub, extending through one of said chambers and said housing end radially outwardly of said first shaft toward said ring; fluid pressure operated means conected with and moving said rack gear in one direction to drive said spur gear and also returning said rack gear; means connected to said housing for simultaneously introducing fluid under pressure into the other chamber of said housing to cause said diaphragm to move said pins into engagement with said thrust ring and thereby move said discs into engaged position; and adjustable stop member mounted in the path of said rack gear to positively limit the stroke thereof in one direction; and means, including an electric switch, to stop the travel of said rack gear in the other direction and to bleed said air from said other clutch member.

(References on following page)

References Cited by the Examiner

UNITED STATES PATENTS

| | | | |
|---|---|---|---|
| 745,763 | 12/1903 | Barlow | 192—100 |
| 1,014,706 | 1/1912 | Houghton | 74—422 X |
| 1,758,370 | 10/1927 | Olsen et al. | 192—88 X |
| 1,879,633 | 9/1932 | Olsen et al. | 192—88 X |
| 2,467,830 | 4/1949 | Hornbostel | 192—88 X |
| 2,605,749 | 8/1952 | Buckendale | 192—88 X |
| 2,796,856 | 6/1957 | Gratzmuller | 192—33 X |
| 2,805,744 | 9/1957 | Cardwell et al. | 192—88 |
| 3,077,968 | 2/1963 | Ahern et al. | 192—148 |

DON A. WAITE, *Primary Examiner.*

DAVID J. WILLIAMOWSKY, *Examiner.*